Oct. 22, 1968

E. M. DAVIDSON 3,406,838

TUBE ASSEMBLING APPARATUS

Filed Oct. 19, 1966

Eugene M. Davidson
INVENTOR.

BY Brownings, Simms, Hyer
& Eickenroht
ATTORNEYS

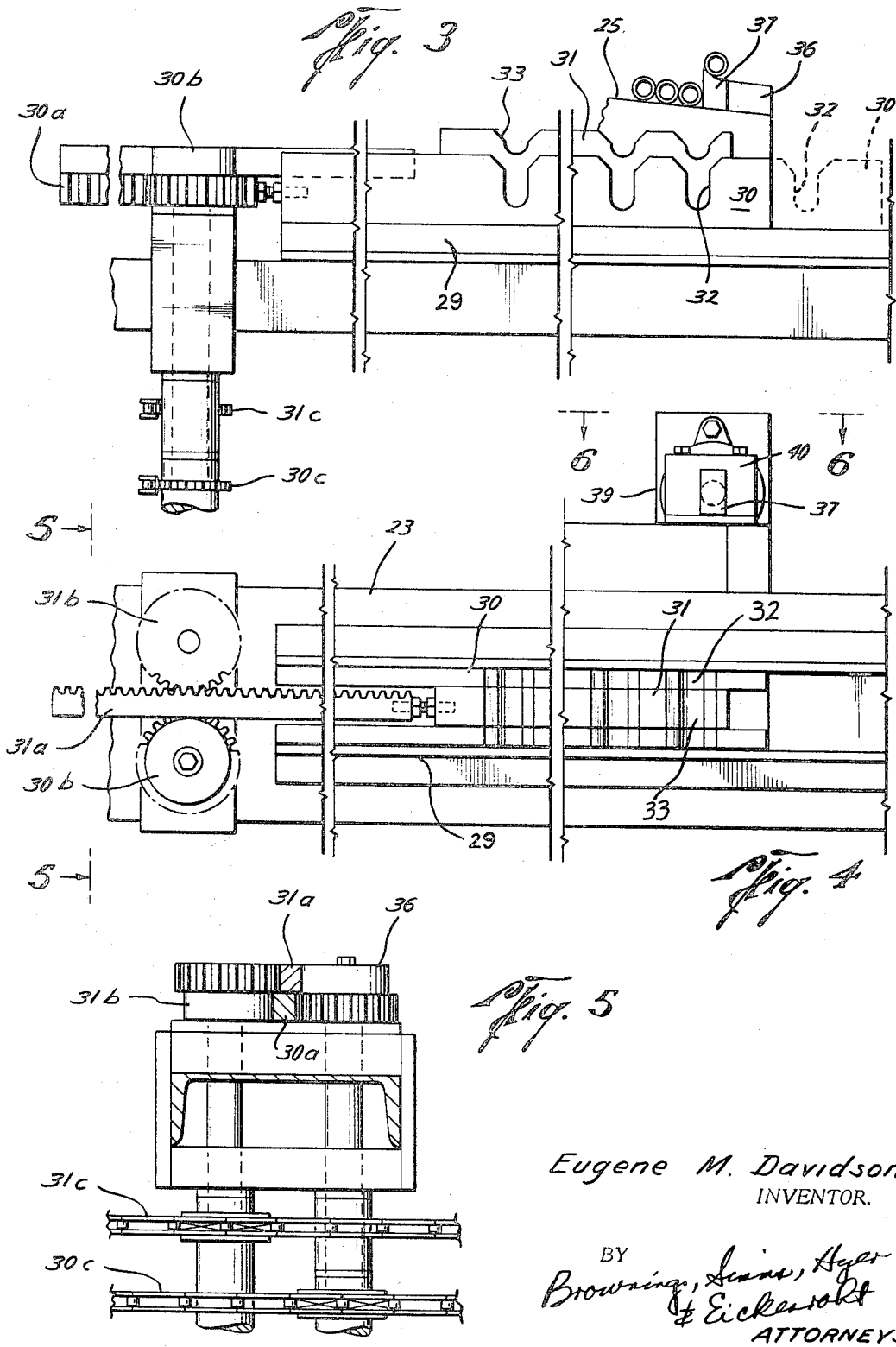

Oct. 22, 1968  E. M. DAVIDSON  3,406,838
TUBE ASSEMBLING APPARATUS

Filed Oct. 19, 1966  4 Sheets-Sheet 3

Eugene M. Davidson
INVENTOR.

BY
Browning, Simms, Hyer
& Eckerrott
ATTORNEYS

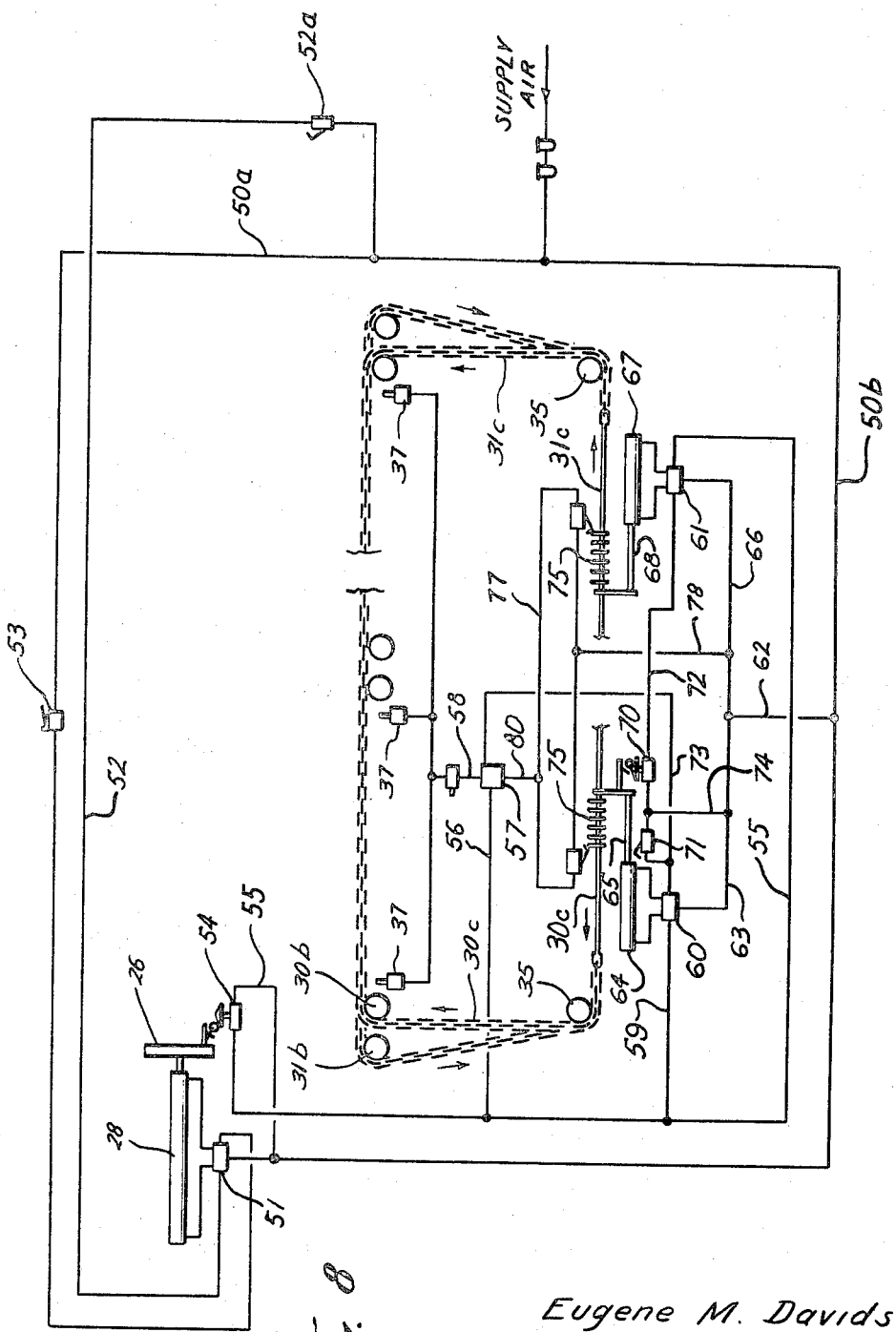

United States Patent Office 3,406,838
Patented Oct. 22, 1968

3,406,838
TUBE ASSEMBLING APPARATUS
Eugene M. Davidson, Houston, Tex., assignor to Hudson Engineering Corporation, Houston, Tex., a corporation of Texas
Filed Oct. 19, 1966, Ser. No. 587,759
7 Claims. (Cl. 214—1)

This invention relates to improved apparatus for assembling two or more rows of tubes or the like in predetermined spaced-apart, side-by-side relation.

In certain types of heat exchangers, two or more rows of side-by-side tubes are surrounded in heat transmitting relation by a stack of closely spaced-apart plate fins. More particularly, each fin is common to all the tubes, and the holes through the fins predetermine the spacing between the tubes. Ordinarily, it has been necessary to move the ends of these tubes one or two at a time through aligned holes in a stack of plate fins. However, a method has been devised for instead moving individual plate fins successively over the ends of an assembly of the tubes.

For this and other purposes, there is a need for apparatus of the type above-described. More particularly, there is a need, and it is an object of this invention to provide, apparatus of this type which enables such tubes or the like to be so assembled within a minimum of time and labor. A still further object is to provide such apparatus which is essentially automatic in operation, but nevertheless inexpensive to construct.

These and other objects are accomplished, in accordance with the illustrated embodiment of the invention, by apparatus which includes a frame and a plurality of sets of longitudinally spaced-apart racks mounted on the frame for lateral movement into and out of a loading area to one side of the frame. More particularly, the sets of racks correspond in number to the rows of tubes or the like to be assembled and are mounted on the frame for movement into vertically spaced-apart relation in the loading area. Each rack of each set has a series of recesses extending across it for supporting the laterally spaced-apart tubes of each row for extension longitudinally between the racks of the set. Thus, a first set of racks may be moved laterally outwardly to receive a lower row of tubes, and a second set of racks may then be moved laterally outwardly into a position above the first set of racks for receiving an upper row of tubes. Obviously additional sets of racks may be provided for receiving additional rows of tubes, if desired. More particularly, a means is provided for automatically moving the sets of racks into the loading area in desired sequence to receive and assemble the tubes, and then moving both sets of racks back out of the loading area upon removal of the assembled tubes from them.

In a preferred embodiment of the invention, the frame includes a platform above the racks for storing tubes, and means for advancing the tubes from the platform onto each of the racks as they are moved into the loading area. More particularly, the tube advancing means is also automatic and so synchronized with respect to the automatic rack moving means as to sequentially load tubes into successive recesses of each rack as they are extended out into the loading area. In the illustrated embodiment of the invention, this means for advancing the tubes comprises a means for urging the tubes on the platform against a stop on the side of the frame adjacent the loading area, and then releasing them one at a time from the stop for falling onto the racks in the manner described.

In the drawings, where there is shown, by way of illustration, one embodiment of the invention:

FIG. 3 is an enlarged elevational view of a pair of racks including one from each of a first and second set of racks, together with the means for advancing tubes onto each of the racks;

FIG. 4 is a plan view of the racks and associated equipment shown in FIG. 3;

FIG. 5 is an end view thereof, as seen along broken line 5—5 of FIG. 4;

FIG. 8 is a schematic diagram of a pneumatic system for automatically operating the apparatus.

Figure 1:
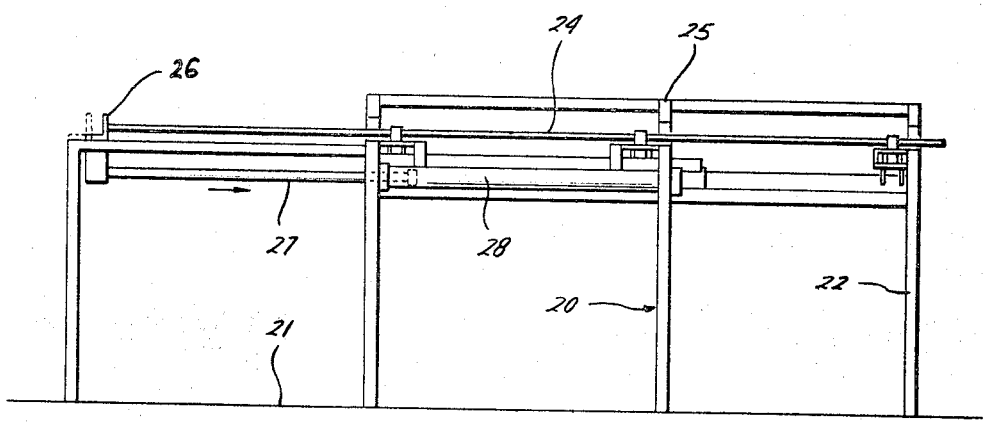
FIG. 1 is a side elevational view of tube assembling apparatus constructed in accordance with the invention.
Figure 2:
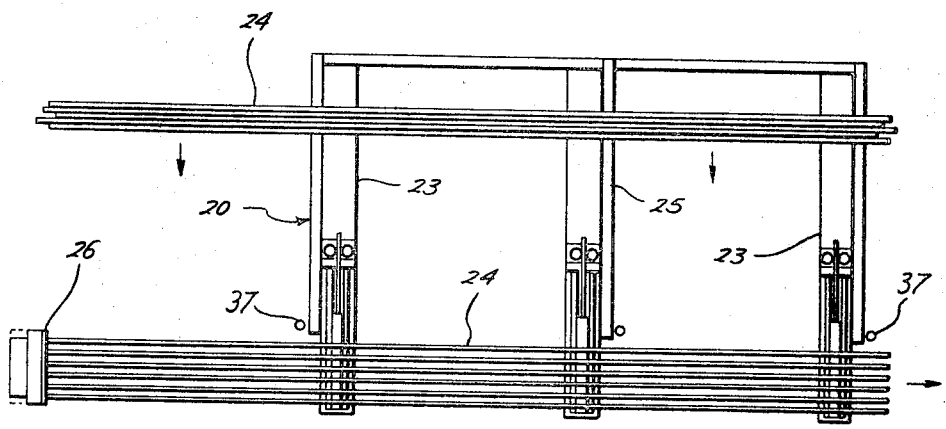
FIG. 2 is a plan view of the apparatus.

With reference now to the details of the above-described drawings, and particularly the somewhat diagrammatic illustration of the overall apparatus in FIGS. 1 and 2, a frame 20 supported on a base 21 includes a plurality of longitudinally spaced-apart uprights 22 and a series of horizontal shelves 23 supported to one side of each of the uprights. The shelves extend laterally for the width of the frame and to one side thereof into a loading area. A plurality of racks are mounted on each shelf for sliding movement laterally into and out of the loading area to one side of the frame, the number of such racks mounted on each shelf depending upon the number of rows of tubes to be assembled. In the illustrated embodiment of the invention, there are a pair of racks for supporting a corresponding number of rows of tubes.

The number of pairs of racks, and thus the number of shelves, depends on the amount of longitudinal support necessary for the tubes. In any event, there will be at least two such support racks for each tube, such two or more racks constituting a "set." Obviously, in supporting straight tubes, the recesses of the racks of each set are aligned.

As will be described in more detail to follow, there is a platform above the frame to support a supply of tubes 24 in position to be advanced onto the racks for assembly purposes upon removal of the previously assembled tubes shown in FIGS. 1 and 2. In the illustrated embodiment of the invention, this platform merely comprises a series of longitudinally spaced-apart support members 25 which are mounted above the shelves 23 to extend laterally across the width of the frame. These members slant at a relatively small angle from the back side of the frame shown at the top of FIG. 2 to the front side thereof adjacent the loading area so as to urge the stored pipe 24 toward a position adjacent the loading area for ejection one at a time, in a manner to be described to follow, into recesses in the racks. Thus, as previously mentioned, the racks of the first set are first moved into loading position so as to receive the tubes of the lower row, and the racks of the second set are then moved into the loading area above the first set for receiving tubes of the upper row. More particularly, the means for ejecting the stored tubes 24 is so synchronized with respect to the advance of the racks of the sets of racks that the tubes are dropped into successive recesses as the racks advance toward the loading area.

When assembled on the racks, the tubes are moved from left to right by means of a pusher 26 connected to a piston 27 movable longitudinally within a cylinder 28 mounted on the frame beneath the extension of the shelves. More particularly, the pusher is adapted to engage the ends of the assembled tubes 24 extending from the left hand end of the frame so as to move them the full stroke of the piston to a position in which their opposite ends extend from the right hand end of the frame. At this time, the extending ends may be grasped by suitable apparatus (not shown) for withdrawing the entire assembly of tubes from supported position on the racks. As indicated by the broken lines of FIGS. 1 and 2, the pusher 25 is initially movable from an extreme left hand position so as to even up the ends of the tubes 24 which, as shown by the stored tubes in FIG. 2, may not be in perfect lateral alignment with one another. At any rate, when the assembled tubes have been moved from left to right and then pulled from the racks, the racks may be withdrawn so as to be positioned for subsequent movement into the loading area.

Obviously, however, this means for removing the assembled tubes from the racks is unimportant to the present invention, other than to illustrate the facility with which the tubes may be withdrawn longitudinally from the rack recesses. Also, and as will be described to follow, the pusher may be synchronized with the tube assembling apparatus in such a manner that it too operates automatically.

As will be apparent from FIGS. 3 to 7, each rack 30 of a first set of racks for supporting the lower row of tubes is guided between rails 29 on the shelf for movement laterally of the frame. More particularly, each rack 30 is essentially U-shaped in cross section and a rack 31 of a second set of racks for supporting the upper row of tubes is guidably received therein for movement laterally of the frame. More particularly, the telescopically arranged racks 30 and 31 of the two sets are movable with respect to one another as well as with respect to the frame so that they are free to be moved into the loading area in the desired sequence.

As also shown in FIGS. 3 to 7, each rack 30 has a series of recesses 32 extending thereacross, each recess being aligned with corresponding recesses of the other racks 30 to receive straight tubes as the racks of the first set are moved simultaneously toward the loading area. As can be seen from the drawings, the recesses 32 are relatively deep so that when the lower row of tubes 24 are supported therein, the lower edges of the racks 31 of the second set are free to move over the supported lower tubes, as shown particularly in FIG. 7. The recesses 33 for each rack 31 may, on the other hand, be relatively shallow since in this particular embodiment of the invention they support the uppermost row of tubes. As in the case of the recesses 32, the recesses 33 of each rack 31 are aligned with corresponding recesses of the other racks of the second set as the racks are moved simultaneously into the loading area. The opposite edges of each of the recesses 32 and 33 are tapered inwardly and downwardly so as to guide the tubes into the recesses as they are dropped onto the racks in a manner to be described.

Although the recesses of the two sets of racks are arranged in the illustrated embodiment of the invention to support the tubes of one row above those of another row, this obviously is not necessary, and the apparatus of the present invention permits the assembly of any desired arrangement of tubes.

Each rack is moved laterally of the frame by means of a toothed rack connected to its end and engaged with a pinion mounted on the shelf 23 of the frame to the rear of the racks. Thus, as shown in FIG. 3, a toothed rack 30a connected to and extending from the end of outer rack 31 is drivingly engaged with pinion 30b mounted on the shelf for rotation about a vertical axis. Each inner rack 31 is similarly connected at its rear end to a toothed rack 31a engaged with the pinion 31b mounted on the shelf 23. The toothed racks 30a and 31a are mounted with the rack 31a disposed above the rack 30a, and with their teeth facing in opposite directions to engage with the pinions for rotation on opposite sides of the vertically aligned racks.

More particularly, the side of the rack 31a opposite the teeth thereon is smooth for sliding past the smooth end of the pinion 30b, and the side of the rack 30a opposite the teeth thereon is smooth for sliding past the smooth lower end of the pinion 31b above the teeth thereon. This construction, which is best illustrated in FIG. 5, provides a compact and simplified arrangement for moving the racks laterally.

As shown in FIGS. 3 and 5, and as will be described to follow, the lower end of each of the pinions 30b and 31b extend beneath the supporting shelf 23 for engagement with an endless chain for rotating it in the desired direction. It is sufficient to say at this stage that the chains are adapted to be moved relative to one another and in opposite directions in moving the racks 30 and 31 into and out of the loading area. For example, and as will be apparent from the drawings, the pinion 30b is rotated by chain 30c in a clockwise direction for withdrawing the rack 30 from the loading area. On the other hand, the roller 31b is rotated by chain 31c in a counterclockwise direction in advancing the rack 31 into the loading area, and then in a clockwise direction to withdraw the rack 31. More particularly, and as shown in FIG. 8, each chain engages with the pinions for moving all the racks of each set simultaneously. As also shown in FIG. 8, and to be described to follow, the chains pass about idler rollers 35 which position other portions thereof for cooperation with a means for synchronizing the rack movement with the tube ejection.

Figure 6:
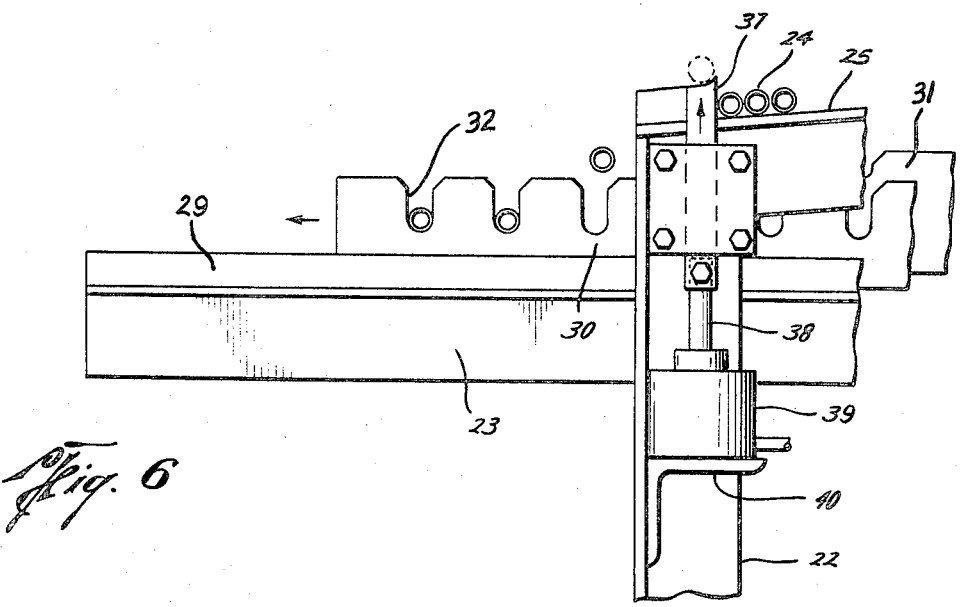
FIG. 6 is an elevational view from the opposite side of the racks shown in FIG. 3, and during movement of the rack of the first set into the loading area and advance of the tubes one by one into the successive recesses of such rack.
Figure 7:
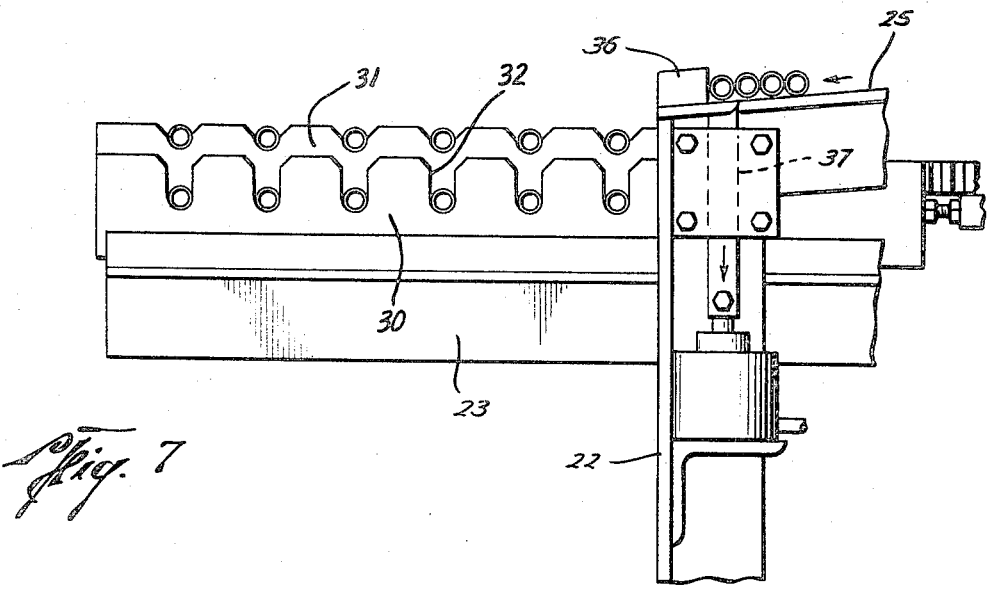
FIG. 7 is a view similar to FIG. 6, but upon movement of both racks into the loading area and with the tubes supported in the recesses of both racks so as to complete their assembly.

As shown in FIGS. 3, 6 and 7, tubes 24 stored on the tilting upper surface of the platform 25 are urged toward a stop 36 at the end of the platform. This normally retains the stored tubes against dropping from the lowermost edge of the top surface of the platform 25 onto the loading area. However, as shown in FIGS. 3 and 7, an ejector 37 is mounted for vertical reciprocation with respect to the platform at a position adjacent the rear side of the stop 36 for selecting and raising one tube at a time over the stop. More particularly, the upper end of this ejector is of substantially the same width as each tube 24 and has an upwardly pointing portion toward its rear side so as to separate the tube above it from the tubes behind it. In this manner, when the ejector is raised, it selects a single tube and lifts it to a level even with the rear surface of stop 36, from which it is free to roll across the stop for falling onto the loading area.

In the meantime, and as well be described to follow, the lateral movement of the racks has been initiated so that as the ejected tube falls from the stop 36, it will fall into a recess in a rack. As shown in FIG. 3, a tube has just been raised above the ejector 37, preparatory to its rolling past the stop 36 into the first recess 32 in the rack 30 as the latter advances into the loading area. FIG. 6 shows the rack 30 advanced to a position to dispose one of its recesses 32 just below a falling tube 24. As the ejector is withdrawn downwardly, the next tube 24 moves against the back side of the stop 36, so that the ejector may be again moved upwardly to select it and move it upwardly beyond the stop 36 for moving into the next successive recess 32 of the rack 30.

The lower end of the ejector 37 is connected to a piston 38 vertically reciprocal within a cylinder 39 mounted on an angle iron 40 carried from an upright 22 of the frame. Thus, as best shown in FIG. 4, the ejector 37 is guided within a housing 40 connected to one side of the upright. In this particular case, the ejectors correspond in number to the racks of each set of racks, and are mounted relatively closely to the racks.

With the parts of the pneumatic operating system in the positions shown in FIG. 8, the sets of racks 30 and 31 are extended into the loading area with the tubes 24 assembled thereon preparatory to being shifted from left to right, as shown in FIGS. 1 and 2. This system includes fluid lines 50a and 50b adapted to receive supply air from a suitable source, as indicated in FIG. 8. Line 50a is connected to the right hand side of a pilot valve 51 connecting with opposite ends of cylinder 28. A fluid line 52 connects the left hand side of the pilot valve 51 with the line 50a intermediate its connection with the supply air and a normally closed, manually operated valve 53. Thus, upon actuation of the valve 53 to open same, supply air is admitted to the right hand side of pilot valve 51 to shift it to the left. This directs supply air from line 50b through the pilot valve to the left side of the cylinder 28 for extending the pusher 26, and thus shifting the assembled tubes from left to right.

As the pusher 26 is so extended, a tripper mounted on it engages a normally closed valve 54 in a fluid line 55 connecting with the line 50b between the supply air and its connection to the pilot valve 51. However, this movement of the pusher from left to right does not actuate valve 54 to open same.

When the pusher 26 has been extended in the manner described and the tubes removed from the racks, the normally closed, manually operated valve 52a in the line 52 is actuated to open same and thereby admit supply air through the line 52 to the left hand side of pilot valve 51. This shifts the pilot valve to the right so as to direct supply air from line 50b to the right hand side of cylinder 28 and thereby retract the pusher 26. Upon such retraction of the pusher, the previously mentioned tripper thereon actuates the lever on valve 54 to open same. This admits supply air from line 50b and through line 55 into a line 56 connecting with the left hand side of valve 57 for moving same to a position in which it is closed. In this manner, supply air is prevented from passing through line 58 to operate ejectors 37, until valve 57 is opened in the manner to be described.

During this time, supply air in line 55 is admitted to the left hand side of pilot valve 60 through line 59 so as to move such pilot to the right. At the same time, supply air is admitted to the right hand end of pilot valve 61 through the line 55 so as to move it to the left. As will be apparent from FIG. 8, when the pilot valve 60 is moved to the right, it admits supply air from the lines 50b, 62 and 63 into the right hand end of cylinder 64. This retracts the rod 65 connected to the chain 30c for moving the chain from right to left, which rotates the pinions 30b in a clockwise direction so as to withdraw the racks 30. At the same time, with pilot valve 61 moved to the left, supply air is admitted through lines 50b, 62 and 66 to the left hand side of cylinder 67 for withdrawing the rod 68 from left to right. This in turn shifts the chain 31c from left to right so as to rotate the pinions 31b in a counterclockwise direction thereby also withdrawing the racks 31.

As can be seen from FIG. 8, there is also a tripper on the end of rod 65 for actuating valve 70, which, similarly to the valve 54, is opened only upon rocking of its lever in one direction. In the system shown, the valve is not opened as the tripper moves from right to left during retraction of rod 65 and shifting of the chain 30c from right to left.

A further normally closed valve 71 is connected in a line 72 connecting the left hand end of pilot valve 61 with a line 73 connecting the right hand end of pilot valve 60 with the valve 57. At the end of its withdrawal, rod 65 engages valve 71 to open same to admit supply air to the right hand side of pilot valve 60 through a fluid line 74 connecting fluid line 63 with fluid line 72 intermediate valves 70 and 71. In this manner, the pilot valve 60 is shifted to the left so as to admit supply air from line 63 to the left hand end of cylinder 64. At the same time, since the valve 70 has remained closed, as previously described, supply air through line 74 is prevented from passing into line 72 and thus to the left hand side of pilot valve 61, so that it remains in the left hand position.

As previously described, this valve 57 was closed by supply air from line 56 so as to prevent supply air from operating the ejectors 37. However, as can be seen from FIG. 8, upon opening of the valve 71 during the final retracting stroke of the rod 65, supply air is admitted to line 73 through lines 72 and 74. This opens valve 57 to connect fluid line 58 with 80, which is adapted to receive supply air from lines 77 and 78, in a manner to be described.

As the rod 65 is extended, a series of contacts 75 on chain 30c are caused to successively actuate a normally closed valve 76 in line 77. More particularly, each such contact momentarily actuates the valve 76 to open same and thereby admit the supply air to the ejectors 37, and particularly the lower end of cylinder 39. The number of contacts, and thus the number of actuations of the ejectors 37, correspond to the number of tubes to be loaded on each rack.

When the rod 65 has completed its extension, the tripper thereon again engages the lever on valve 70, but in this case during movement from left to right so as to open the valve 70. Thus, when the racks 30 are fully extended and the last tube has been ejected for assembly thereon, supply air in line 74 is admitted through line 72 to shift the pilot valve 61 to the right. This also retracts the rod 68 so as to move contacts 75 on chain 31c past a similar normally closed valve 76. Thus, the ejectors are again successively reciprocated so as to feed tubes onto the racks 31. In this respect, it will be appreciated that extension of the rod 65 moves the chain 30c from left to right so as to rotate the pinions 30b to extend the racks 30, and extension of rod 68 moves the chain 31c from right to left to rotate the pinions 31b in a clockwise direction for extending the racks 31.

Thus, upon extension of rod 68, both sets of racks 30 and 31 have been extended and loaded with tubes preparatory to shifting the assembled tubes from left to right by means of the pusher 26. This completes the cycle of the system to return it to the position in which its parts are located as shown in FIG. 8. Obviously, however, although this provides a simple and inexpensive system for automatically operating the apparatus, similar systems may be used within the scope of the present invention.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for assembling tubes or the like in predetermined spaced apart, side-by-side relation, comprising a frame, a first set of longitudinally spaced apart racks mounted on the frame for lateral movement into and out of a loading area to one side of the frame, each rack of the first set having a series of recesses extending thereacross for supporting a lower row of tubes extending longitudinally between them, a second set of longitudinally spaced apart racks mounted on the frame for lateral movement into and out of the loading area and above the first set of racks and tubes supported thereon, each rack of the second set also having a series of recesses extending thereacross for supporting an upper row of tubes extending longitudinally between them, and means for first moving said first set of racks into said loading area to receive the lower row of tubes, next moving said second set of racks into said loading area to receive the upper row of tubes, and then moving both sets of racks back out of the loading area upon removal of the assembled tubes therefrom.

2. Apparatus of the character set forth in claim 1, wherein the frame includes a platform above the racks for storing tubes thereon, and means for advancing the tubes from the platform onto each of the racks as said racks are moved laterally into said loading area.

3. Apparatus for the character described in claim 2, including means for synchronizing the rack moving means and tube advancing means so as to sequentially load tubes into successive recesses of each rack as they are extended.

4. Apparatus of the character set forth in claim 2, wherein said advancing means includes means for urging the stored tubes toward the side of the frame adjacent the loading area, means on said side of the frame for stopping said tubes, and means for releasing one tube at a time from said stop means for falling onto the racks.

5. Apparatus of the character set forth in claim 4, wherein said releasing means includes an ejector for lifting one tube at a time from the platform and over the stop means.

6. Apparatus of the character set forth in claim 1, wherein the racks of the two sets are arranged in pairs in which each rack of the second set is telescopically and guidably movable within a rack of the first set, and said moving means includes a toothed rack on each inner tube supporting rack above a toothed rack on each outer tube supporting rack, a pinion on each side of the toothed racks, and means on each pinion for engaging a toothed rack to reciprocate it.

7. Apparatus of the character set forth in claim 6, including an endless drive chain engaging each of the pinions for reciprocating the inner racks, and another endless drive chain engaging each of the pinions for reciprocating the outer racks, and means for reciprocating each of the chains.

References Cited

UNITED STATES PATENTS 2,850,795   9/1958   Nichols et al. _____ 214—1 XR
3,089,226   5/1963   Szöts et al. _____ 29—202 XR ROBERT G. SHERIDAN, *Primary Examiner.*

F. E. WERNER, *Assistant Examiner.*